United States Patent
Umehara et al.

(10) Patent No.: US 6,798,164 B2
(45) Date of Patent: Sep. 28, 2004

(54) INITIALIZING DRIVE APPARATUS

(75) Inventors: Hidemasa Umehara, Shizuoka (JP);
Yoshihisa Yamada, Shizuoka (JP);
Kazuya Tsubaki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 116 days.

(21) Appl. No.: 10/298,063

(22) Filed: Nov. 18, 2002

(65) Prior Publication Data

US 2003/0094916 A1 May 22, 2003

(30) Foreign Application Priority Data

Nov. 19, 2001 (JP) ..................................... P2001-352925

(51) Int. Cl.[7] .............................................. G01R 5/16
(52) U.S. Cl. ...................................... 318/685; 116/284
(58) Field of Search ............................... 318/685, 696;
116/62.1, 284, 286, 287, 288; 324/139,
143, 144, 151 R; 702/142

(56) References Cited

U.S. PATENT DOCUMENTS

| | | | |
|---|---|---|---|
| 5,333,371 A | * 8/1994 | Mittenbuhler et al. | 29/595 |
| 5,994,893 A | * 11/1999 | Maruyama et al. | 324/144 |
| 6,034,501 A | * 3/2000 | Sato et al. | 318/696 |
| 6,356,046 B1 | * 3/2002 | Koumura et al. | 318/696 |
| 6,624,608 B2 | * 9/2003 | Komura | 318/696 |

FOREIGN PATENT DOCUMENTS

| | | |
|---|---|---|
| DE | 44 23 119 C1 | 12/1995 |
| JP | 2000-507797 | 6/2000 |

* cited by examiner

Primary Examiner—Bentsu Ro
(74) Attorney, Agent, or Firm—Sughrue Mion, PLLC

(57) ABSTRACT

When excited states of excitation coils are controlled at a both excitation step of magnetizing both of two excitation coils, an initializing driving means 41a inputs excitation pulses in which a duty ratio thereof at an interval of time controlled by the both excitation step is less than 1 to the excitation coils. Contact detecting means 42 detects contact based on voltages generated at the excitation coils when the excitation pulses are not inputted.

3 Claims, 8 Drawing Sheets

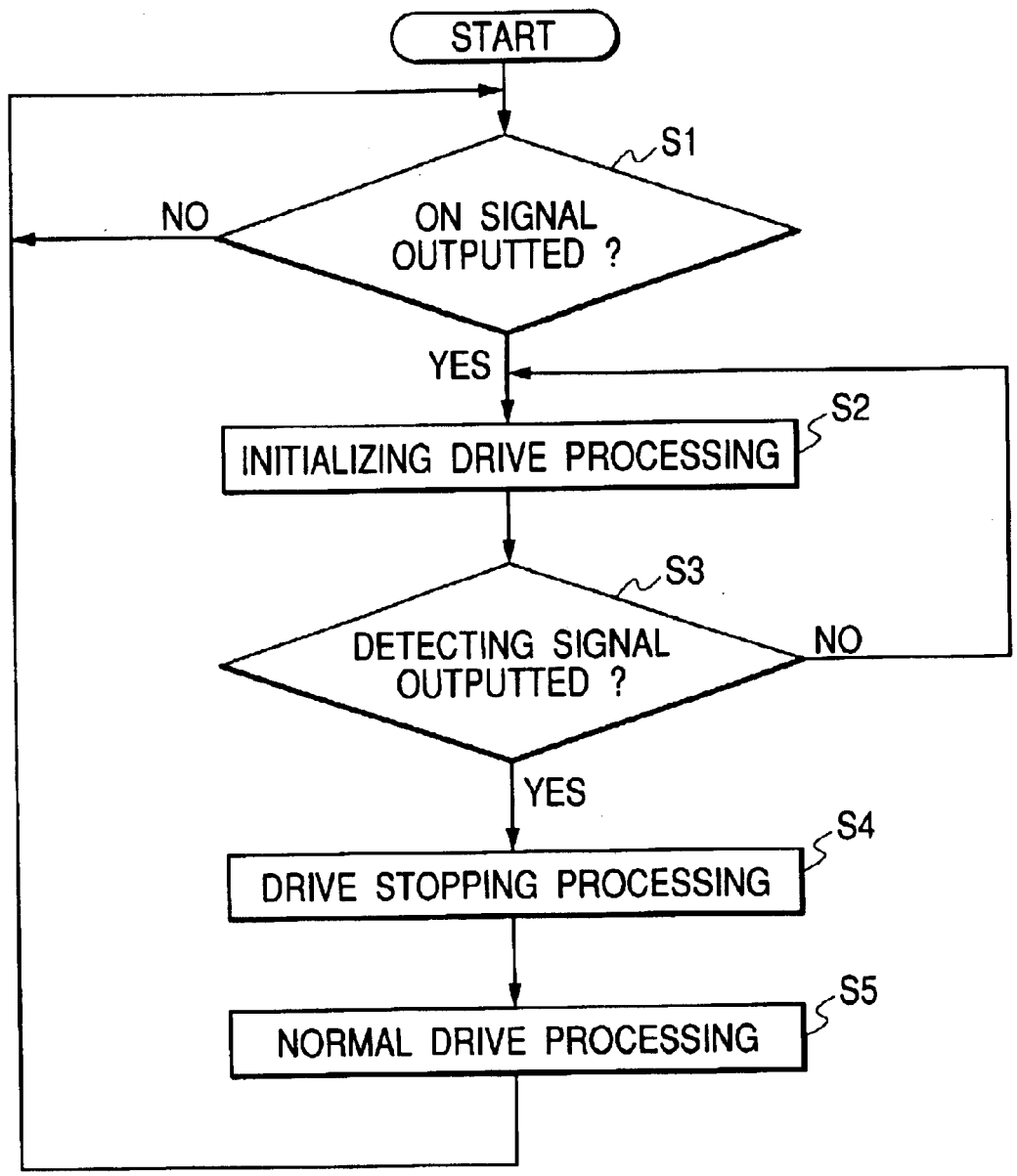

IN ROTATING

IN CONTACT

US 6,798,164 B2

INITIALIZING DRIVE APPARATUS

BACKGROUND OF THE INVENTION

The present invention relates to an initializing drive apparatus, particularly to an initializing drive apparatus for resetting an out-of-phase state of a stepping motor.

Conventionally, as a vehicular indicating apparatus using a stepping motor, an indicator instrument as shown by FIG. 1 is known. In the drawing, the indicator instrument includes a stepping motor 1, an indicator 2 moved in cooperation with rotation of the stepping motor 1 and a drive apparatus 4 for the stepping motor which regularly and reversely rotates the stepping motor 1. The above-described stepping motor 1 includes two excitation coils 1$a$1 and 1$a$2, a rotor 1$b$ in which N and S poles are alternately magnetized by respective three poles and rotated in response to changes in excited states of the excitation coils 1$a$1 and 1$a$2 and gears id for transmitting drive force of the rotor 1$b$ to the indicator 2.

The stepping motor 1 includes a piece 1$e$ as a driven member provided on a rear side of the gear 1$d$ on which the indicator 2 is provided and which is moved in cooperation with rotational movement of the rotor 1$b$, and a stopper 1$f$ for mechanically stopping rotation of the rotor 1$b$ by being brought into contact with the piece 1$e$ which is provided at a containing case, not illustrated, the containing case contains the excitation coils 1$a$1 and 1$a$2, the rotor 1$b$, the gears 1$d$ and the piece 1$e$.

Rotation of the stepping motor 1 to direct the piece 1$e$ to the stopper 1$f$ is defined as reverse rotation. A rotational direction of the indicator 2 rotating reversely is defined as a reverse rotational direction Y4. In contrast thereto, rotation of the stepping motor 1 to separate the piece 1$e$ from the stopper 1$f$ is defined as regular rotation. A rotational direction of the indicator 2 rotating regularly is defined as regular rotational direction Y3. The stopper 1$f$ is provided to indicate a graduation of, for example, 0 km/h on a dial when the stopper 1$f$ is brought into contact with the piece 1$e$.

Here, an explanation will be given of the principle of operating to rotate the stepping motor 1 in reference to FIG. 7 showing an example of a relationship between excited states of the excitation coils 1$a$1 and 1$a$2 and rotation of the rotor 1$b$ as follows. First, when the stepping motor 1 is controlled to bring about an excited state determined in excitation step (1), that is, such that a side of the excitation coil 1$a$1 becomes S pole and b side of the excitation coil 1$a$2 becomes nonexcited, N pole of the rotor 1$b$ is attracted to the a side of the excitation coil 1$a$1 and stabilized.

Next, when the operation proceeds to excitation step (2) and the stepping motor 1 is controlled such that the a side of the excitation coil 1$a$1 becomes S pole and the b side of the excitation coil 1$a$2 becomes S pole and magnetic forces of the two excitation coils 1$a$1 and 1$a$2 become equal to each other, the rotor 1$b$ is stopped at a position rotated from a position of the rotor 1$b$ of excitation step (1) by 15 degrees in an arrow mark Y2 direction. In accordance with rotation of the rotor 1$b$ in the arrow mark Y2 direction, the indicator 2 is rotated in the arrow mark Y4 direction (refer to FIG. 1).

In the following, when the stepping motor 1 is controlled such that the a side of the excitation coil 1$a$1 and the b side of the excitation coil 1$a$2 respectively become nonexcited, S pole (excitation step (3))→N pole, S pole (excitation step (4))→N pole, nonexcited (excitation step (5))→N pole, N pole (excitation step (6))→nonexcited, N pole (excitation step (7))→S pole, N pole (excitation step (8)), the rotor 1$b$ is rotated by respective 15 degrees in the arrow mark Y2 direction by following the change in the excited state. Further, in the excitation steps (2), (4), (6) and (8) in which both of the exciting coils 1$a$1 and 1$a$2 are magnetized, the stepping motor 1 is controlled such that the magnetic forces of the two excitation coils 1$a$1 and 1$a$2 become equal to each other.

When the stepping motor 1 is controlled to the excited state prescribed at excitation step (1) again from the excitation step (8), the rotor 1$b$ is rotated by 15 degrees further in the arrow mark Y2 direction and stabilized. Therefore, by controlling the excited states of the excitation coils 1$a$1 and 1$a$2 by repeating a plurality of excitation steps (1) through (8) which differ from each other in accordance with a regular excitation pattern constituted by aligning excitation steps in a previously determined order (1)→(2) ... →(8), the rotor 1$b$ is rotated by respective 15 degrees in the arrow mark Y2 direction at respective steps. Hereinafter, notation of the rotor 1$b$ in the arrow mark Y2 direction is referred to as reverse rotation.

In order to rotate the rotor 1$b$ in the arrow mark Y1 direction, the excited states of the excitation coils 1$a$1 and 1$a$2 may be controlled in accordance with a reverse excitation pattern in which excitation steps constituting the regular excitation pattern are aligned in a reverse order such as excitation steps (8)→(7)→ ... →(1). In accordance with rotation of the rotor 1$b$ in the arrow mark Y1 direction, the indicator 2 is moved in the arrow mark Y3 direction (refer to FIG. 1). Hereinafter, rotation of the rotor 1$b$ in the arrow mark Y1 direction is referred to as regular rotation.

Further, in order to change the excited states of the excitation coils 1$a$1 and 1$a$2 such as excitation steps (8)→. . . →(1), the drive apparatus 4 respectively inputs excitation pulses as shown by FIG. 8 to the a and b sides of the excitation coils 1$a$1 and 1$a$2.

Next, an explanation will be given of operation when the indicating apparatus is used in, for example, a vehicle speed meter as follows. The drive apparatus 4 is supplied with angle data D1 indicating a rotational angle of the rotor 1$b$ in correspondence with a moving amount θ-θ' which is a difference between a target position θ which is an indicating position of the indicator 2 calculated based on vehicle speed information measured by a vehicle speed meter and a current position θ'. By controlling the excited states of the excitation coils 1$a$1 and 1$a$2 in accordance with the angle data D1 by the drive apparatus 4, the indicator 2 is moved by the moving amount θ-θ' and indicates the target position θ.

Meanwhile, there is a case in which the indicating apparatus becomes out of phase in which the moving amount θ-θ' of the indicator 2 to be moved inherently and an actual moving amount differ from each other owing to input of the angle data D1 superposed with vibration or noise of the vehicle. Further, when the out-of-phase is repeated, there is brought about a difference between the speed indicated by the indicator 2 and the speed information measured by the speed sensor and the indicating apparatus cannot indicate accurately.

Hence, in order to resolve such a problem, the drive apparatus 4 is made to carry out initializing operation, mentioned later. In the initializing operation, the drive apparatus 4 rotates the stepping motor 1 reversely such that the piece 1$e$ is directed to move to the side of the stopper 1$f$ at each time of making an ignition switch ON. When the piece 1$e$ is brought into contact with the stopper 1$f$ and the indicator 2 is mechanically stopped at a contact position which is at graduation of 0 km/h on the dial, the drive apparatus 4 holds the excitation coils 1$a$1 and 1$a$2 in a previously determined initial excited state and electrically stops rotation of the stepping motor 1. By carrying out the above-described initializing operation, there is carried out resetting operation for resetting the difference between the speed indicated by the indicator 2 and the speed information measured by the speed sensor.

However, it is necessary for the above-described indicating apparatus to rotate the rotor 1b such that the indicator 2 is moved by an angle (A+α) which is larger than a pivoting angle A of the indicator 2 in order to firmly bring the piece 1e into contact with the stopper 1f. Therefore, there poses a problem that a time period for necessarily moving the indicator 2 by the angle (A+α) is consumed in the resetting operation regardless of whether the difference is brought about between the speed indicated by the indicator 2 and the speed information measured by the speed sensoror regardless of whether the difference is large or small and time is excessively taken in the resetting operation.

Although the piece 1e is brought into contact with and stopped by the stopper 1f, rotation of the excitation coils 1a1 and 1a2 is not electrically stopped and therefore, the piece 1e repeats to be brought into contact with and separated from the stopper 1af, sound of "click, click" is emitted at every time of bringing the piece 1e into contact with the stopper 1f and the sound is unpleasant for a driver.

Hence, in order to resolve the above-described problem, there is known an indicating apparatus in which control of rotation of the rotor 1b is stopped to thereby finish the resetting operation simultaneously with bringing the piece 1e into contact with the stopper 1f. That is, during a time period in which the piece 1e is not brought into contact with the stopper 1f and the rotor 1b is rotating, induced voltage is generated at the excitation coil 1a1 or 1a2 controlled in the nonexcited state. Meanwhile, when the piece 1e is brought into contact with the stopper 1f and rotation of the rotor 1b is stopped, induced voltage is not generated in the excitation coil 1a1 or 1a2 controlled in the nonexcited state.

Attention is paid to the above-described, a detecting and excitation step is constituted by excitation step (1), (2), (5) or (7) at which either of the excitation coils 1a1 and 1a2 is controlled in the nonexcited state and at every time of controlling the excitation coils 1a1 and 1a2 by the detecting and excitation step, voltage across both ends of the excitation coil 1a1 or 1a2 which is brought into the nonexcited state can be detected.

The indicator 2 is integrated to the rotor 1b such that the indicator 2 is brought into contact with the stopper 1f in an excitation step one step preceding the detecting and excitation step in rotating reversely. Specifically, when the detecting and excitation step is constituted by excitation step (1), the indicator 2 is made to be brought into contact with the stopper 1f at the excitation step (2) which is an excitation step one step preceding the excitation step ① in rotating reversely.

When detected voltage across both ends of the excitation coil 1a1 or 1a2 exceeds a previously determined threshold, induced voltage is generated at the excitation coil 1a1 or 1a2 and it is determined that the rotor 1b is rotating. Meanwhile, there is conceived a constitution in which when the voltage across the both ends is equal to or smaller than the threshold, induced voltage is not generated, the piece 1e is determined to be brought into contact with the stopper 1f and stopped at a zero position and control of the excited state for rotating the indicator 2 reversely is stopped to thereby finish the resetting operation.

Meanwhile, according to the method of constituting the detecting and excitation step by the excitation step controlled in the nonexcited state as described above, the contact can be detected only at the excitation step (1), (3), (5) or (7) which is a half of the eight excitation steps (1) through (8).

Therefore, there is a case in which rotation of the rotor 1b is not stopped at the detecting and excitation step (1), (3), (5) or (7) and rotation of the rotor 1b is stopped at the excitation step (2), (4), (6) or (8) owing to a backlash of the gear 1d or the like.

Hence, conventionally, there has been a request of detecting the. contact at an arbitrary point. However, as shown in FIG. 8, at the excitation steps (2), (4), (6) or (8) the excitation coils 1a1 and 1a2 are excited by an excitation pulse having a duty ratio of 1. Therefore, in order to detect the contact at all of the excitation steps (1) through (8), there is only a method of providing a detecting coil separately from the excitation coils 1a1 through 1a2 which poses a problem in view of cost.

SUMMARY OF THE INVENTION

Hence, it is a problem of the invention to provide an initializing drive apparatus capable of firmly detecting that a driven member is brought into contact with a stopper by paying attention to the above-described problem.

In order to solve the aforesaid object, the invention is characterized by having the following arrangement.

(1) A initializing drive apparatus comprising:

an initializing driving unit for rotating a stepping motor including two of excitation coils so that a driven member moved in cooperation with an operation of rotating the stepping motor is moved toward a stopper for mechanically stopping rotation of the stepping motor by being brought into contact with the driven member;

a contact detecting unit for detecting that the rotation of the stepping motor is mechanically stopped by bringing the driven member into contact with the stopper; and a drive stopping unit for electrically stopping the operation of rotating the stepping motor in accordance with the detection of the contact detecting unit, wherein the initializing driving unit rotates the stepping motor by a predetermined angle at each time of changing excited states of the excitation coils in accordance with an excitation pattern constituted by aligning a plurality of difference excitation steps in a previously determined order for determining the excited states of two of the excitation coils, wherein when the excited states of the excitation coils are controlled so that both of the two excitation coils are magnetized, the initializing driving unit inputs excitation pulses having a duty ratio less than 1 to the excitation coils, and wherein the contact detecting unit detects the contact between the driven member and the stopper based on voltage generated in the excitation coils when the both of the two excitation coils are magnetized and the excitation pulses are not inputted.

(2) The initializing drive apparatus according to (1), wherein the contact detecting unit detects the contact between the driven member and the stopper based on the voltages generated in the two excitation coils when the excitation pulses are not inputted to the two excitation coils.

(3) The initializing drive apparatus according to (1), wherein the contact detecting unit detects the voltages generated in the excitation coils a plural number of times and detects the contact between the driven member and the stopper based on a result of the detection.

BRIEF DESCRIPTION OF THE DRAWINGS

FIG. 3 is a flowchart showing a processing procedure of CPU 41a of FIG. 2.

DETAILED DESCRIPTION OF PREFERRED EMBODIMENTS

Figure 1:
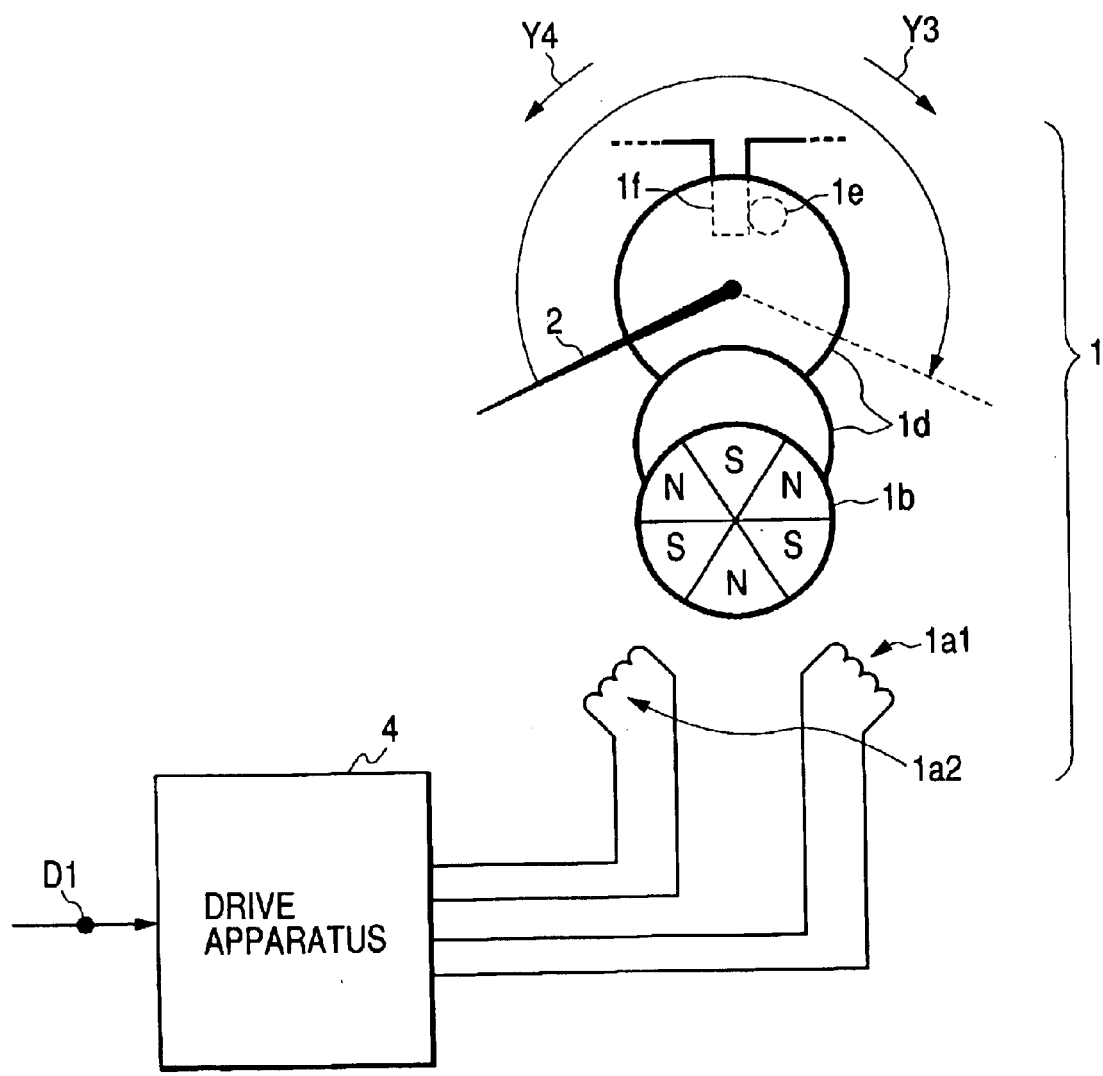
FIG. 1 shows an embodiment of an indicating apparatus integrated with an initializing drive apparatus according to the invention.

An explanation will be given of an embodiment of the invention in reference to the drawings as follows. FIG. 1 is a view showing an indicating apparatus integrated with an initializing drive apparatus according to the invention. The indicating apparatus includes the stepping motor 1, the indicator 2 and the drive apparatus 4 as explained in the above-described conventional example. The stepping motor 1 includes the excitation coils 1a1 and 1a2, the rotor 1b, the gears 1d, the piece 1e (corresponding to a driven member in claims) and the stopper 1f.

The rotational direction of the indicator 2 when the stepping motor 1 is rotated such that the piece 1e is directed to move to the stopper 1f is defined as the reverse direction Y4. The rotational direction of the indicator 2 when the stepping motor 1 is rotated such that the piece 1e is separated from the stopper 1f is defined as the regular direction Y3. The stopper 1f is provided such that when the piece 1e is brought into contact with the stopper 1f, the indicator 2 indicates zero.

Figure 2:
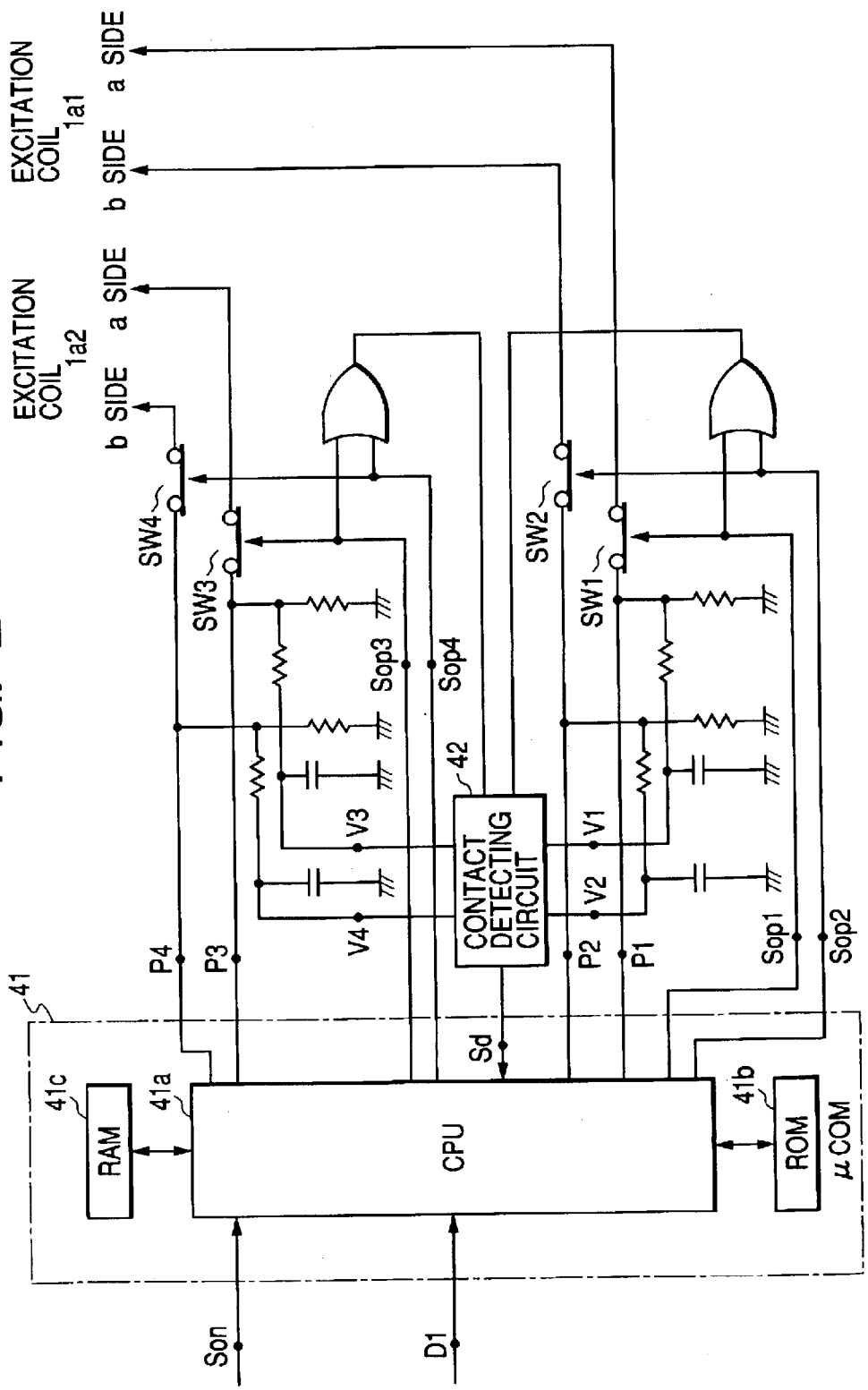
FIG. 2 is a detailed constitution view of a drive apparatus 4 shown in FIG. 1.

Next, an explanation will be given of a constitution of the drive apparatus 4 in reference to FIG. 2. The drive apparatus 4 includes a microcomputer 41 to which both ends of the excitation coils 1a1 and 1a2 are connected. By outputting excitation pulses P1 through P4 from the μmicrocomputer 41, the excited states of the respective excitation coils 1a1 and 1a2 are changed and the rotor 1b follows to rotate.

The microcomputer 41 is connected with an ignition switch (hereinafter, abbreviated as IGSW), not illustrated, and when the IGSW is switched ON, ON signal Son at H level is supplied thereto. The microcomputer 41 is supplied with the angle data D1. The angle data D1 is data in accordance with a measured value measured by a sensor, not illustrated.

The microcomputer 41 includes a central processing unit (CPU) 41a for executing various processings in accordance with programs, ROM 41b which is a read only memory stored with processing programs executed by CPU 41a and RAM 41c which is a readable and writable memory having a work area utilized in various-processing procedures at CPU 41a and a store area for storing various data and so on, which are connected to each other by a bus line, not illustrated.

The drive apparatus 4 includes switches SW1 and SW2 respectively provided on connecting lines of the both ends of the excitation coil 1a1 and the microcomputer 41 and switches SW3 and SW4 respectively provided on connecting lines of the both ends of the excitation coil 1a2 and the microcomputer 41. By opening the switches SW1 and SW2, a side and b side of the excitation coil 1a1 are respectively opened. By opening the switches SW3 and SW4, a side and b side of the excitation coil 1a2 are respectively opened. Control terminals (not illustrated) of the switches SW1 through SW4 are connected to the microcomputer 41 and the switches SW1 through SW4 are opened when opening signals Sop1 through Sop4 are respectively supplied from the microcomputer 41 to the control terminals.

The drive apparatus 4 includes a contact detecting circuit 42 as a contact detecting unit supplied with voltages V1 through V4 generated at one-side ends of the excitation coils 1a1 and 1a2, OR output of the opening signals Sop1 and Sop2 and OR output of the opening signal Sop3 and Sop4. The contact detecting circuit 42 detects that the piece 1e is brought into contact with the stopper 1f and rotation of the rotor 1b is mechanically stopped based on voltage V1 or V2 generated at the excitation coil 1a1 one end of which is opened by opening the switches SW1 and SW2 and voltage V3 or V4 generated at the excitation coil 1a2 one end of which is opened by opening the switches SW3 and SW4 and outputs a detecting signal Sd at H level to the microcomputer 41 in accordance with the detection.

An explanation will be given as follows of operation of the indicating apparatus having the above-described constitution with reference to a flowchart showing a processing procedure of CPU 41a of FIG. 3 and time charts of FIG. 4 and FIG. 5.

CPU 41a starts operating by, for example, inputting a battery power source, not illustrated, and initially sets various areas formed in RAM 41c in the microcomputer 41 at an initial step (not illustrated).

Figure 4A:
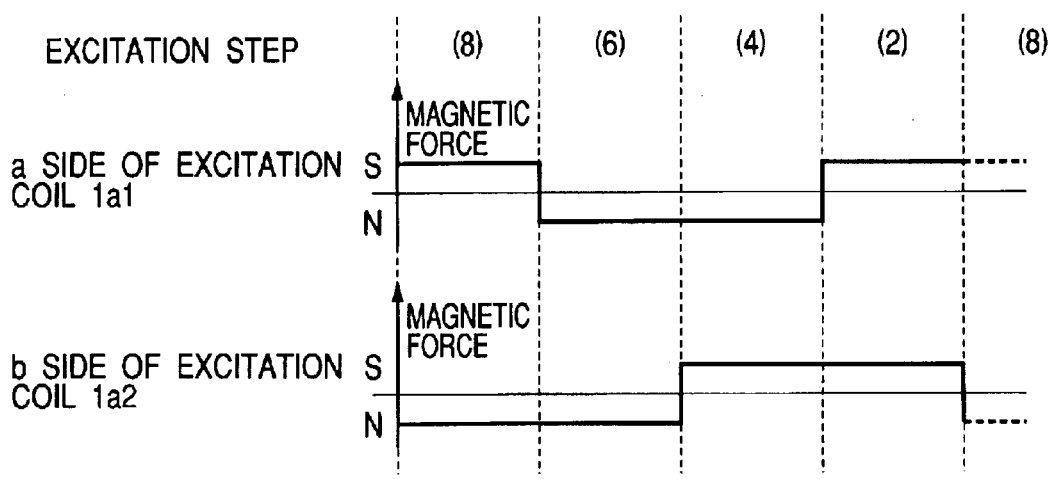
FIG. 4A is a time chart of excited states of excitation coils 1a1 and 1a2.

Thereafter, when IGSW is operated to be switched ON by a driver and the ON signal Son is supplied (Y at step S1), CPU 41a is operated as an initializing driving unit and starts an initializing drive processing (step S2). In the initializing drive processing, CPU 41a rotates the rotor 1b such that the piece 1e is moved to the stopper 1f by repeatedly changing the excited states of the excitation coils 1a1 and 1a2 in accordance with the reverse excitation pattern constituted by four excitation steps of (8)→(6)→(4)→(2) as shown by FIG. 4A.

More in details, CPU 41a controls the rotor 1b such that the a side of the excitation coil 1a1 and the b side of the excitation coil 1a2 opposed to the rotor 1b to respectively become S pole, N pole (excitation step (8))→N pole, N pole (excitation step (6))→N pole, S pole (excitation step (4))→S pole, S pole (excitation step (2)). When the excited states of the excitation coils 1a1 and 1a2 are changed in this way, the rotor 1b is rotated by 60 degrees in the arrow mark Y2 direction in accordance with changes of the excited states. In cooperation with rotation in the arrow mark Y2 direction of the rotor 1b, the indicator 2 is moved in the arrow mark Y4 direction.

Figure 4B:
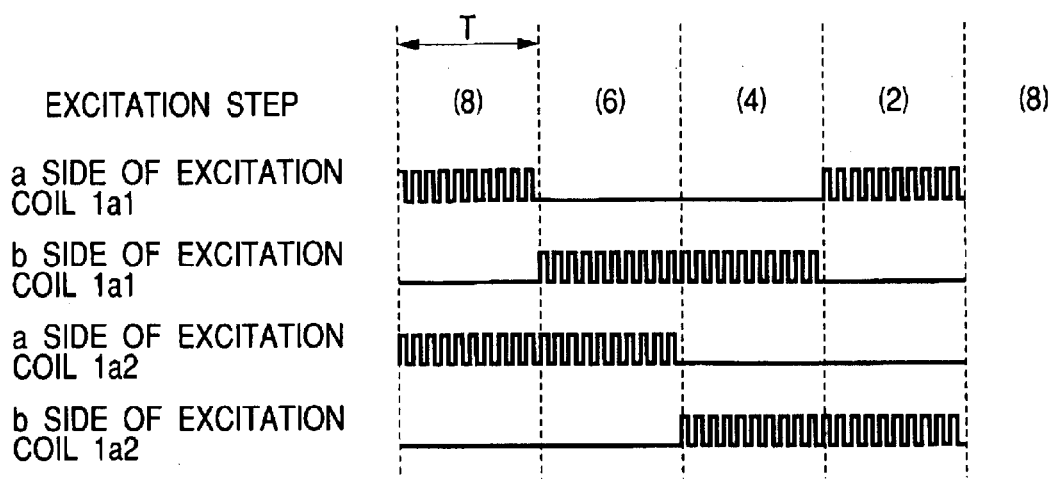
FIG. 4B is a time chart of excitation pulses outputted from CPU 41a to both ends of the excitation coils 1a1 and 1a2.

When the rotor 1b is controlled in accordance with excitation steps of (8), (6), (4) and (2) at which both of the two excitation coils 1a1 and 1a2 are magnetized, as described above, there are not produced timings in which the excitation coils 1a1 and 1a2 are controlled to be nonexcited as in the conventional example. Hence, in a time interval T in which the excited states of the excitation coils 1a1 and 1a2 are excited in accordance with the respective excitation step (8), (6), (4) or (2), CPU 41 in the indicating apparatus of the invention executes excitation by not using an excitation pulse having a duty ratio of 1 as in the conventional example but using an excitation pulse having a duty ratio less than 1, for example, a duty ratio of 1/5 as shown by FIG. 4B.

Further, in the initializing drive processing, at excitation steps (8) and (4), at a timing at which the excitation pulse is not inputted, CPU 41a outputs the opening signals Sop1 and Sop3 to the switch SW1 provided on the a side of the excitation coil 1a1 and the switch SW3 provided on the a side of the excitation coil 1a2. Meanwhile, at excitation steps (6) and (2), at a timing at which the excitation pulse is not inputted, CPU 41a outputs the opening signals Sop2 and Sop3 to the switch SW2 provided on the b side of the excitation coil 1a1 and the switch SW3 provided on the b side of the excitation coil 1a2.

Figure 5A:
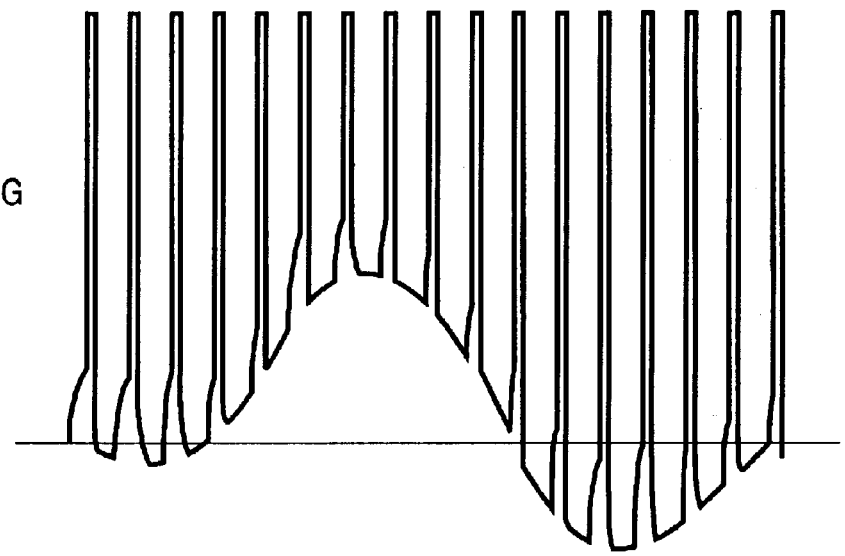
FIGS. 5 (a) and 5 (b) illustrate time charts of voltages V1 through V4 at the excitation coil 1a1.
Figure 5B:
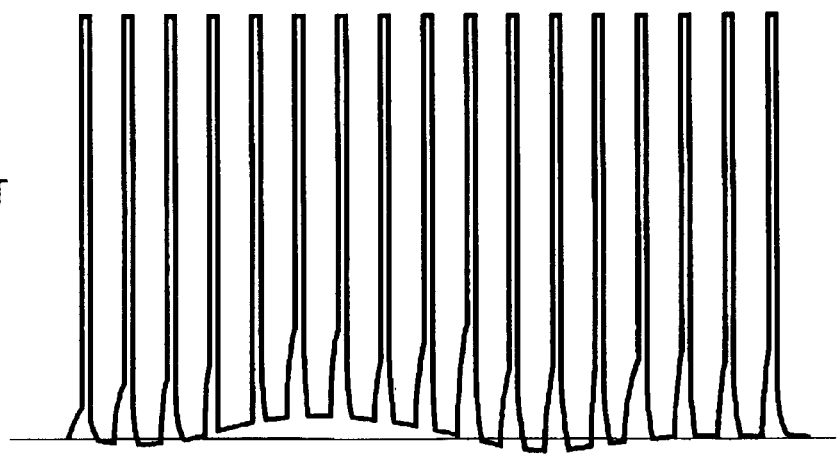

When one-side ends of the excitation coils 1a1 and 1a2 are opened by outputting the opening signals Sop1 through Sop4 at the above-described timings, voltages V1 through V2 as shown in FIGS. 5A and 5B are generated at both ends of the excitation coils 1a1 and 1a2. When the piece 1e is not brought into contact with the stopper 1f and the rotor 1b is rotated, large induced voltage as shown by a bold line is generated at the timing of opening one end of the excitation coil 1a1 as shown in FIG. 5A. Meanwhile, in the case in which the piece 1e is brought into contact with the stopper 1f and rotation of the rotor 1b is stopped, even when one end of the excitation coil 1a1 is opened, induced voltage is hardly generated as indicated by a bold line as shown in FIG. 5B.

Attention is paid to the above-described and the contact detecting circuit 42 compares voltage V1 or V2 generated at the excitation coil 1a1 and voltage V3 or V4 generated at the excitation coil 1a2 with a previously determined threshold at timings at which OR outputs of the opening signals Sop1 through Sop4 (=timings at which the excitation pulse are not inputted to the excitation coils 1a1 and 1a2). When the voltage V1 or V2 is equal to or smaller than the threshold and the voltage V3 or V4 is equal to or smaller than the threshold, the contact detecting circuit 42 determines that induced voltage is not generated and the piece 1e is brought into contact with the stopper 1f and outputs the detecting signal Sd.

When the detecting signal Sd is outputted (Y at step S3 of FIG. 3) by the contact detecting circuit 42, CPU 41a operates as a drive stopping unit executes a drive stopping processing for stopping output of the excitation pulse (step S4) and thereafter executes a normal drive processing (steps S5).

The above-described normal drive processing is a processing of rotating the rotor 1b regularly or reversely by an angle in accordance with the angle data D1 by changing the excited states of the respective excitation coils 1a1 and 1a2 by outputting the excitation pulse in accordance with the angle data D1. By the normal drive processing, the indicator 2 indicates the measured value. Thereafter, when IGSW is operated to be switched OFF and output of the ON signal Son is stopped, CPU 41a finishes the normal drive processing and returns to step S1.

According to the above-described indicating apparatus, even when both of the two excitation coils 1a1 and 1a2 need to magnetize as in excitation steps of (8), (6), (4) and (2), the duty ratio of the excitation pulses inputted to the two excitation coils 1a1 and 1a2 is made to be less than 1. Therefore, timings at which the excitation pulse is not inputted and electricity is not conducted to the excitation coils 1a1 and 1a2 can be provided at excitation steps of (8), (6), (4) and (2).

Therefore, contact can be detected at all of excitation steps of (8), (6), (4) and (2) constituting the reverse excitation pattern and contact of the piece 1e to the stopper 1f can firmly be detected.

Although according to the above-described embodiment, contact is detected based on voltages generated at both of the excitation coils 1a1 and 1a2 in two of the excitation coils 1a1 and 1a2. However, it is conceivable to detect contact based on voltage generated at the excitation coil 1a2 of one of the two excitation coils 1a1 and 1a2.

As shown in FIG. 5A, induced voltage generated at the excitation coil 1a1 may be large or may be small. Therefore, when contact is determined at a timing at which small induced voltage is generated, there is a concern of erroneously detecting that the piece 1e is brought into contact with the stopper 1f although the rotor 1b is rotating. Hence, voltage produced at the excitation coil is detected by a plural number of times and contact is detected based on a result of detection, so that the contact can accurately be detected since a timing at which large induced voltage is generated is firmly included.

According to the above-described embodiment, the drive apparatus 4 generates the excitation pulse and controls timings of opening one-side ends of the excitation coils 1a1 and 1a2 at inside of the microcomputer 41. However, the constitution of the drive apparatus 4 is not limited to the above-described constitution but, for example, as shown by FIG. 6, a motor drive control circuit 42 including a drive wave form generating portion 42b for generating the excitation pulse and a timing control circuit 43a for controlling timings of opening one-side ends of the excitation coils 1a1 and 1a2, may be provided separately from the microcomputer 41.

Figure 6:
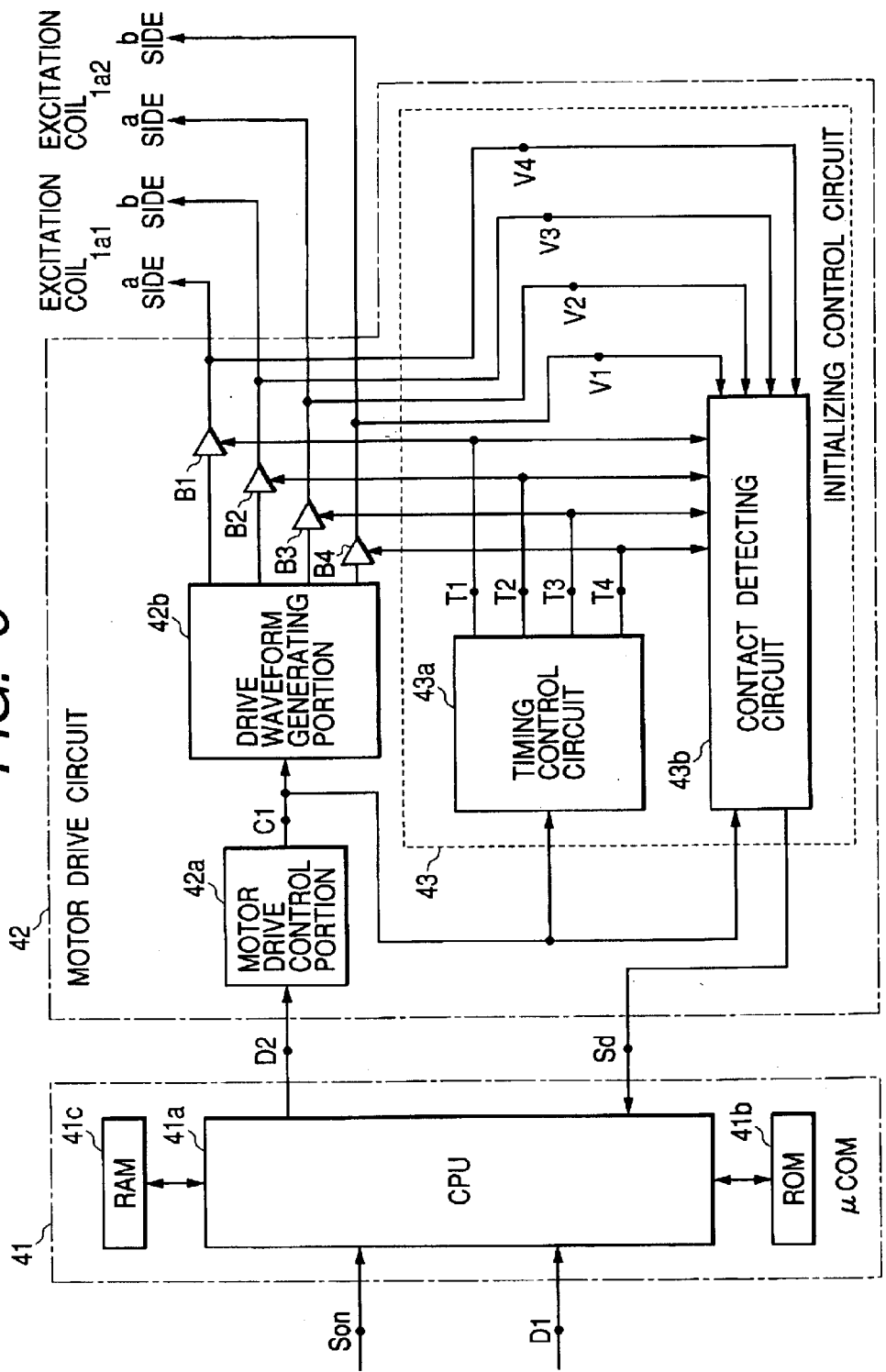
FIG. 6 shows an embodiment of an indicating apparatus integrated with an initializing drive apparatus according to the invention.
Figure 7:
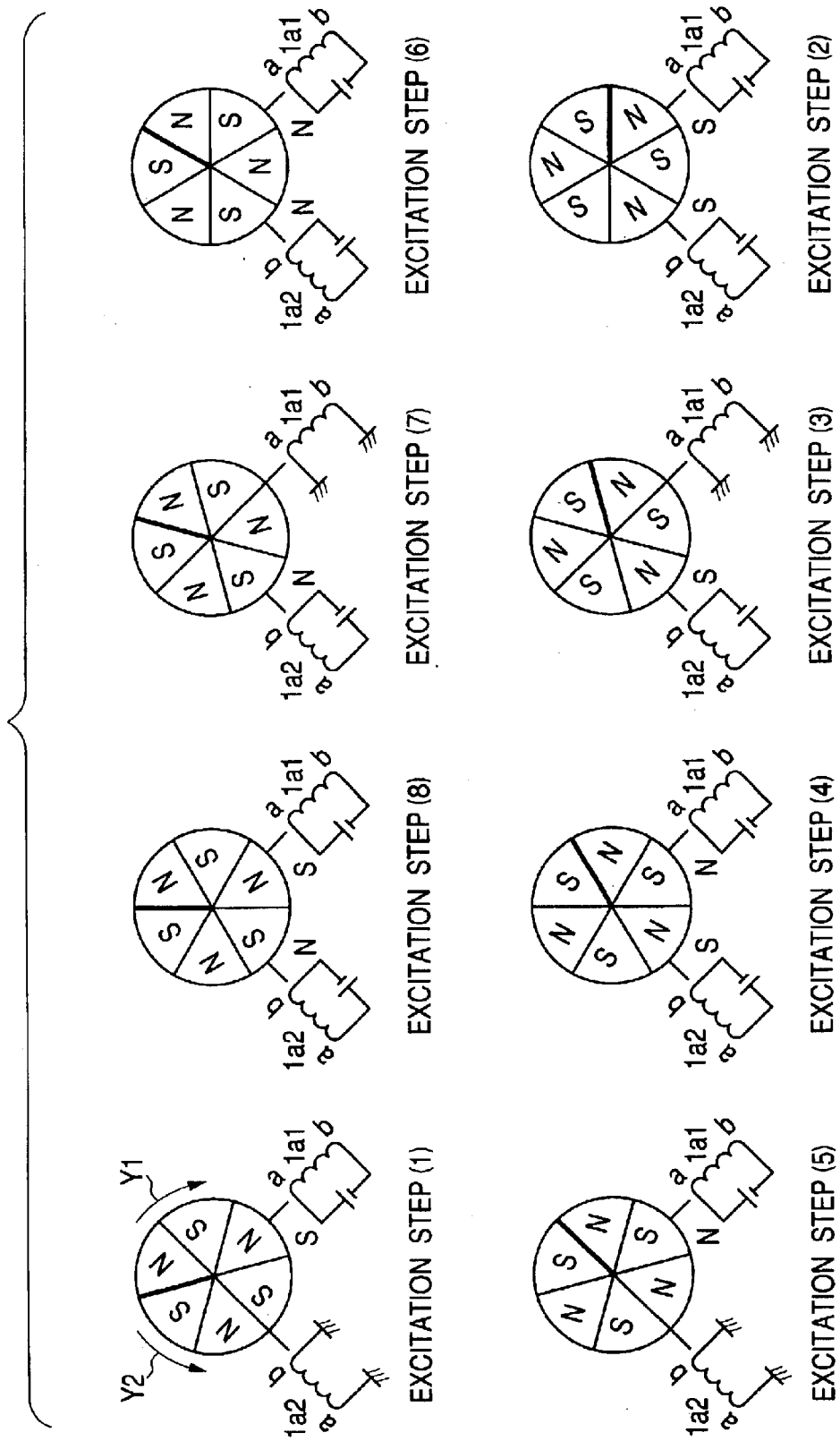
FIG. 7 illustrates views showing an example of a relationship between an excited state of an excitation coil and rotation of a rotor.
Figure 8:
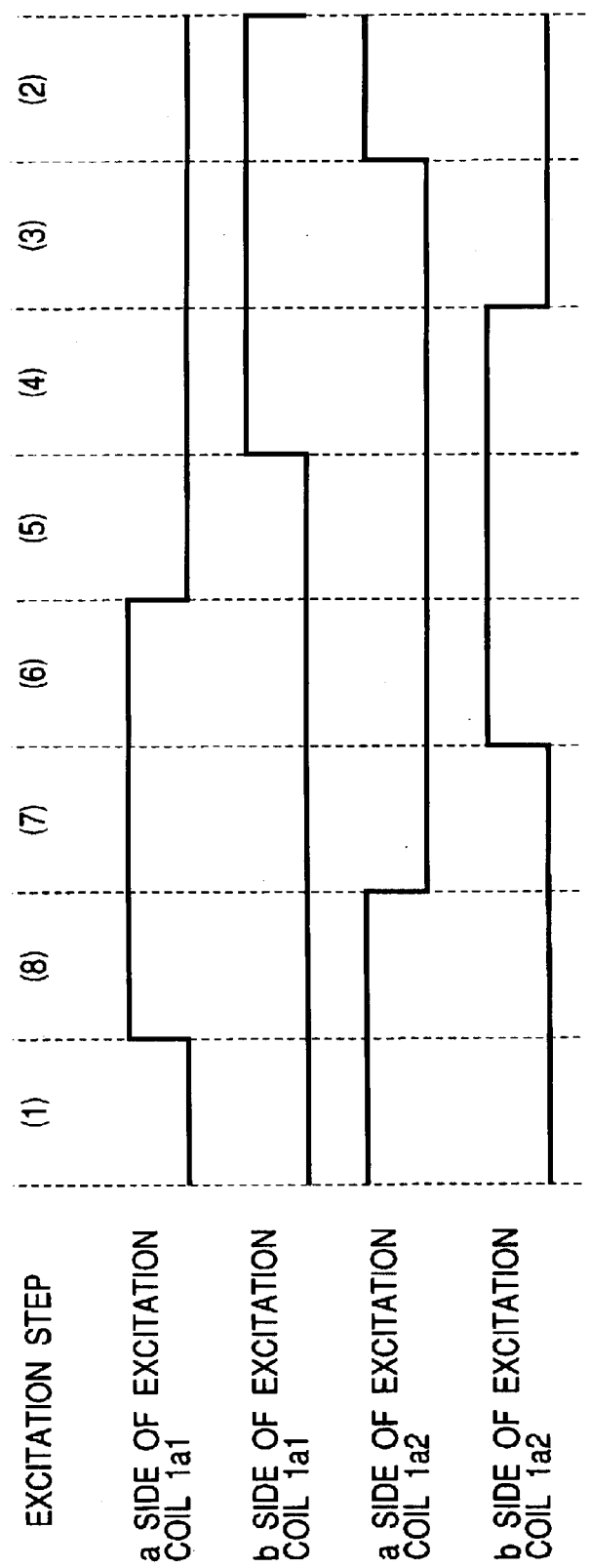
FIG. 8 is a time chart showing an example of excitation pulses outputted to both ends of conventional excitation coils 1a1 and 1a2.

Explaining details of the drive apparatus 4 of FIG. 6, the drive apparatus 4 includes the microcomputer 41 for processing the ON signal Son, the detecting signal Sd, the angle data D1 and the like and outputting motor drive data D2 and the motor drive circuit 42. The motor drive circuit 42 includes a motor drive control portion 42a for generating data C1 which is angle data for driving the motor and data for starting initializing based on the motor drive data D2, the drive wave form generating portion 42b for generating the excitation pulse for the initializing drive processing and the excitation pulse for the normal drive processing and an initializing control circuit 43.

The initializing control circuit 43 includes: a timing control circuit 43a for outputting timing signals T1 through T4 to buffers B1 through B4 provided between the both ends of the excitation coils 1a1 and 1a2 and the drive waveform generating portion 42b and for opening one-side ends of the excitation coils 1a1 and 1a2 which are brought into the nonexcited state; and a contact detecting circuit 43b for detecting contact of the piece 1e with the stopper 1f based on voltages V1 through V4 of the excitation coils 1a1 and 1a2 one-side ends of which are opened by the timing control circuit 43a and for outputting the detecting signal Sd.

As explained above, according to the invention, in all of the excitation steps constituting the excitation pattern, the contact can be detected and therefore, there can be provided the initializing driving apparatus capable of firmly detecting that the driven member is brought into contact with the stopper at an arbitrary point.

According to the invention, by detecting the contact based on the voltages generated at the two excitation coils, even when the induced voltage is hardly generated at either one of the two excitation coils, when the induced voltage is generated at other of the excitation coils, it can be determined that the stepping motor is rotated and therefore, there can be provided the initializing driving apparatus capable of accurately detecting the contact.

According to the invention, by detecting the contact based on the result of detecting the contact by a plural number of times, even when noise or the like is temporarily superposed on the detected voltages, it is not erroneously determined that the stepping motor is rotating by determining the noise as generation of the induced voltage and therefore, there can be provided the initializing drive apparatus capable of accurately detecting the contact.

What is,claimed is:

1. A initializing drive apparatus comprising:
   an initializing driving unit for rotating a stepping motor including two of excitation coils so that a driven member moved in cooperation with an operation of rotating the stepping motor is moved toward a stopper for mechanically stopping rotation of the stepping motor by being brought into contact with the driven member;
   a contact detecting unit for detecting that the rotation of the stepping motor is mechanically stopped by bringing the driven member into contact with the stopper; and
   a drive stopping unit for electrically stopping the operation of rotating the stepping motor in accordance with the detection of the contact detecting unit,
   wherein the initializing driving unit rotates the stepping motor by a predetermined angle at each time of changing excited states of the excitation coils in accordance with an excitation pattern constituted by aligning a plurality of difference excitation steps in a previously determined order for determining the excited states of two of the excitation coils,
   wherein when the excited states of the excitation coils are controlled so that both of the two excitation coils are magnetized, the initializing driving unit inputs excitation pulses having a duty ratio less than 1 to the excitation coils, and
   wherein the contact detecting unit detects the contact between the driven member and the stopper based on voltage generated in the excitation coils when the both of the two excitation coils are magnetized and the excitation pulses are not inputted.

2. The initializing drive apparatus according to claim 1, wherein the contact detecting unit detects the contact between the driven member and the stopper based on the voltages generated in the two excitation coils when the excitation pulses are not inputted to the two excitation coils.

3. The initializing drive apparatus according to claim 1, wherein the contact detecting unit detects the voltages generated in the excitation coils a plural number of times and detects the contact between the driven member and the stopper based on a result of the detection.

* * * * *